United States Patent

Okabe et al.

[15] 3,707,036

[45] Dec. 26, 1972

[54] METHOD FOR FABRICATING SEMICONDUCTOR LSI CIRCUIT DEVICES

[72] Inventors: Takahiro Okabe, Hachioji; Minoru Nagata; Tsugio Makimoto, both of Kodaira, all of Japan

[73] Assignee: Hitachi, Ltd., Tokyo, Japan

[22] Filed: Feb. 27, 1970

[21] Appl. No.: 15,135

[30] Foreign Application Priority Data

Feb. 28, 1969 Japan ................................44/14620

[52] U.S. Cl. .......................................29/574, 29/577

[51] Int. Cl. ............................................B01j 17/00

[58] Field of Search ............29/577, 577 IC, 628, 574

[56] References Cited

UNITED STATES PATENTS

| | | | |
|---|---|---|---|
| 3,377,513 | 4/1968 | Ashby et al. | 29/577 IC |
| 3,128,332 | 4/1964 | Burkig et al. | 29/577 IC |
| 3,423,822 | 1/1969 | Davidson et al. | 29/577 IC |
| 3,484,932 | 12/1969 | Cook | 29/577 IC |

*Primary Examiner*—John F. Campbell
*Assistant Examiner*—W. Tupman
*Attorney*—Craig & Antonelli

[57] ABSTRACT

LSI circuit devices are fabricated by forming a plurality of unit cells having a relatively large number of circuit elements. The unit cells are tested and the cells having predetermined characteristics are selected. A portion of the selected unit cells are divided to form sub-unit cells. The sub-unit cells are then interconnected with or without undivided unit cells to form LSI circuit devices.

5 Claims, 10 Drawing Figures

INVENTORS
TAKAHIRO OKABE, MINORU NAGATA and
TSUGIO MAKIMOTO
BY Craig, Antonelli, Stewart & Hill
ATTORNEYS

INVENTORS

TAKAHIRO OKABE, MINORU NAGATA and

TSUGIO MAKIMOTO

BY Craig, Antonelli, Stewart & Hill

ATTORNEYS

INVENTORS

TAKAHIRO OKABE, MINORU NAGATA and

TSUGIO MAKIMOTO

BY Craig, Antonelli, Stewart & Hill

ATTORNEYS

INVENTORS

TAKAHIRO OKABE, MINORU NAGATA and

TSUGIO MAKIMOTO

BY

Craig, Antonelli, Stewart & Hill

ATTORNEYS

METHOD FOR FABRICATING SEMICONDUCTOR LSI CIRCUIT DEVICES

FIELD OF THE INVENTION

This invention relates to a method for fabricating semiconductor large scale integrated circuits, and more particularly to a method for fabricating semiconductor large scale integrated circuit devices having a multiplicity of unit cells.

BACKGROUND OF THE INVENTION

Semiconductor large scale integrated circuits (LSI circuits) are generally composed of a multiplicity of circuit elements formed on a common substrate or wafer in comparison to conventional integrated circuits (IC circuits) which contain a smaller number of circuit elements. This multiplicity of circuit elements in LSI circuits makes effective interconnection of these elements extremely important.

Semiconductor LSI circuit devices are preferably fabricated by preparing a plurality of unit cells, each unit cell containing mutually interconnected circuit elements, on a semiconductor substrate, and then interconnecting various unit cells to obtain a circuit which performs the desired function. This fabrication technique is used because of the large number of circuit elements contained in LSI circuits. The use of unit cells simplifies the layout of the circuit elements on the substrate and simplifies the design of mask patterns used in the step of interconnecting the circuit elements to form the unit cells. This technique increases the yield of LSI circuit devices.

This increase in yield results from the face that the use of unit cells allows for the rejection of unsatisfactory circuit elements without rejecting the entire LSI circuit. It is almost impossible for all of the circuit elements formed on a substrate to have satisfactory characteristics using presently known fabrication techniques. Therefore, it is almost inevitable that unsatisfactory circuit elements will be included among the circuit elements formed on a substrate. If an LSI circuit device is formed by interconnecting circuit elements, without regard to their quality, in accordance with a fixed metalization interconnection pattern normally used in the formation of conventional IC circuits, unsatisfactory LSI circuit devices will result when unsatisfactory elements are included in the circuit.

The elimination of the unsatisfactory circuit elements would thus increase the yield of LSI circuits. However, the measurement of the characteristics of each circuit element formed on a semiconductor wafer, individually, to determine which elements are unsatisfactory is troublesome. The use of unit cells in fabricating LSI circuit devices eliminates the need to determine the characteristics of each circuit element because the examination of each unit cell serves as an estimation of all the constituent circuit elements.

Once the idea of LSI circuit elements fabricated using unit cells has been developed, the next step is to develop a unit cell having the most versatile functions. The use of a versatile unit cell permits the fabrication of many functional LSI circuit devices merely by changing the connections between the unit cells. A versatile unit cell can be prepared by constructing the cell into a simple and small sized structure, as shown in U.S. Pat. 3,365,707, for example. This patent discloses two different unit cells each having two mutually interconnected insulated gate type field effect devices.

The above description illustrates that a unit cell composed of a reduced number of circuit elements is extremely versatile in designing LSI circuit devices. However, a large number of these unit cells normally have to be incorporated in order to form an LSI circuit device and thus a large number of man-hours is required to inspect the numerous unit cells employed. Furthermore, numerous interconnections between the unit cells are required resulting in a complex interconnection pattern.

SUMMARY OF THE INVENTION

An object of the present invention is to provide a new and improved method for fabricating a semiconductor LSI circuit device wherein the circuit elements are tested more easily and more effectively than in the prior method and which has good versatility for designing different LSI circuit devices.

The basic concept of the present invention resides in the steps of forming on a substrate a plurality of unit cells each of which can be easily inspected to determine the unit cell characteristics and is composed of as large a number of circuit elements as possible, inspecting the characteristics of the respective unit cells, dividing a certain number of qualified unit cells into sub-unit cells each composed of one or more circuit elements, and then interconnecting said sub-unit cells and, if desired, undivided qualified unit cells into an LSI circuit device.

According to the present invention, each unit cell includes a relatively large number of circuit elements and has interconnections between said constituent circuit elements, respectively, whereby the inspection in the characteristics of the respective unit cells can be conducted easier than the inspection of more versatile unit cells.

Further, the present invention is characterized by dividing a certain number of the qualified unit cells each composed of mutually interconnected circuit elements into sub-unit cells, respectively, by removing at least partially the interconnections therein, so that the constituent circuit elements of the qualified unit cell are separated into either individual ones or small sub-connections each of which is composed of two or more circuit elements with sub-interconnection therebetween. Accordingly, unit cells can be inspected and then the circuit elements which comprise the unit cell and are satisfactory, can be freed from their interconnections, so that they are freely recombined with other circuit elements into various circuit structures desired.

The features and advantages of the present invention will become apparent from the following description taken in conjunction with the accompanying drawing.

It should be noted that the following description explains the invention with reference to the unit cell shown in FIG. 1 for the purpose of explanation only, and that this invention is not limited to the embodiments shown, but various unit cells other than the circuit shown in FIG. 1 may be effectively applied thereto within the scope of the invention.

DESCRIPTION OF THE PREFERRED EMBODIMENTS

Figure 2:
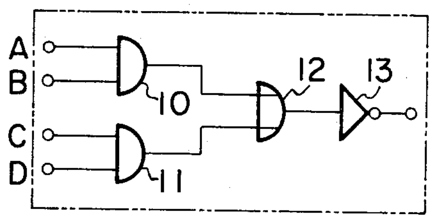
FIG. 2 is a schematic diagram of the unit cell of FIG. 1 circuit.

Referring now to FIG. 2 showing a unit cell used in the present invention, which unit cell comprises two two-input AND gates 10 and 11, one OR gate 12 and one inverter 13 and functions as a whole an AND·OR·I NVERT circuit.

Figure 1:
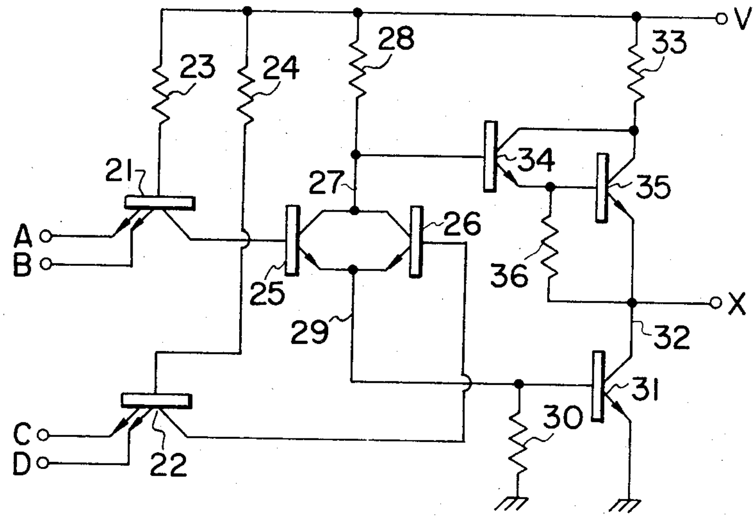
FIG. 1 shows a circuit of a unit cell used in the present invention.

This unit cell of FIG. 2 is detailed in FIG. 1 wherein there are provided multi-emitter type NPN transistors 21 and 22 acting, respectively, as the AND gates 10 and 11, whose bases are connected through resistors 23 and 24 respectively to a positive terminal V of a power source, whose plural emitters are provided with input terminals A and B and C and D, respectively, and whose collectors are connected to the bases of transistors 25 and 26, respectively.

The emitters and the collectors of the transistors 25 and 26 are connected together, respectively, so that they constitute the OR gate 12. The common collector 27 is connected through a load resistor 28 to the positive terminal V and the common emitter 29 is grounded through a resistor 30, so that the operation of transistors 25 and 26 are controlled by transistors 21 or 22, respectively, connected to their bases.

Assuming now that input signals applied to the input terminals A, B, C, and D are designated by S*a*, S*b*, S*c* and S*d*, respectively.

When the input signals S*a* and S*b* are both " that is, the input signals are higher in potential than the base potential of the transistor 21, the transistor 21 is rendered non-conductive and the transistor 25 is turned to be in its conductive state. On the other hand, when at least one of the input signals S*a* and S*b* is "0," that is, at least one of the signal potentials is lower than the base potential of the transistor 21, the transistor 25 is rendered non-conductive since the transistor 21 is conductive.

Similarly, the operation of the transistor 26 will be in its conductive state only when both the input signals S*c* and S*d* are "1."

Consequently, the output signal of the OR gate appearing across the resistor 30 is expressed in logic formula as A·B+C·D, and it is then supplied to the base of the inverter transistor 31 having a signal reshaping function, whereby a reshaped signal is obtained from an output terminal X provided on the collector 32 of the transistor 31.

The emitter of the transistor 31 is grounded, and the collector 32 thereof is connected through a load resistor element 33 to the positive terminal V. In case of this embodiment, transistors 34 and 35 which are connected in Darlington configuration are inserted between the collector 32 of the transistor 31 and the load resistor element 33. This connection may improve the switching characteristics thereof since it facilitates quick charging of the capacitive load connected to the output terminal when the output signal changes from "0" to "1." A resistor element 36,is provided for self-biasing,between the base and the emitter of the transistor 35.

The unit cell described above is integrated by applying an impurity diffusion technique, photoetching technique and evaporation interconnection technique, known per se, on the surface of semiconductor substrate. According to the present invention, the respective unit cells are normally formed so as to arrange equi-distantly on the semiconductor substrate, but the unit cells may be formed into blocks by grouping a proper number of unit cells so as to be convenient for the mutual interconnection between the unit cells after the formation of the unit cells on the substrate.

Figure 3:
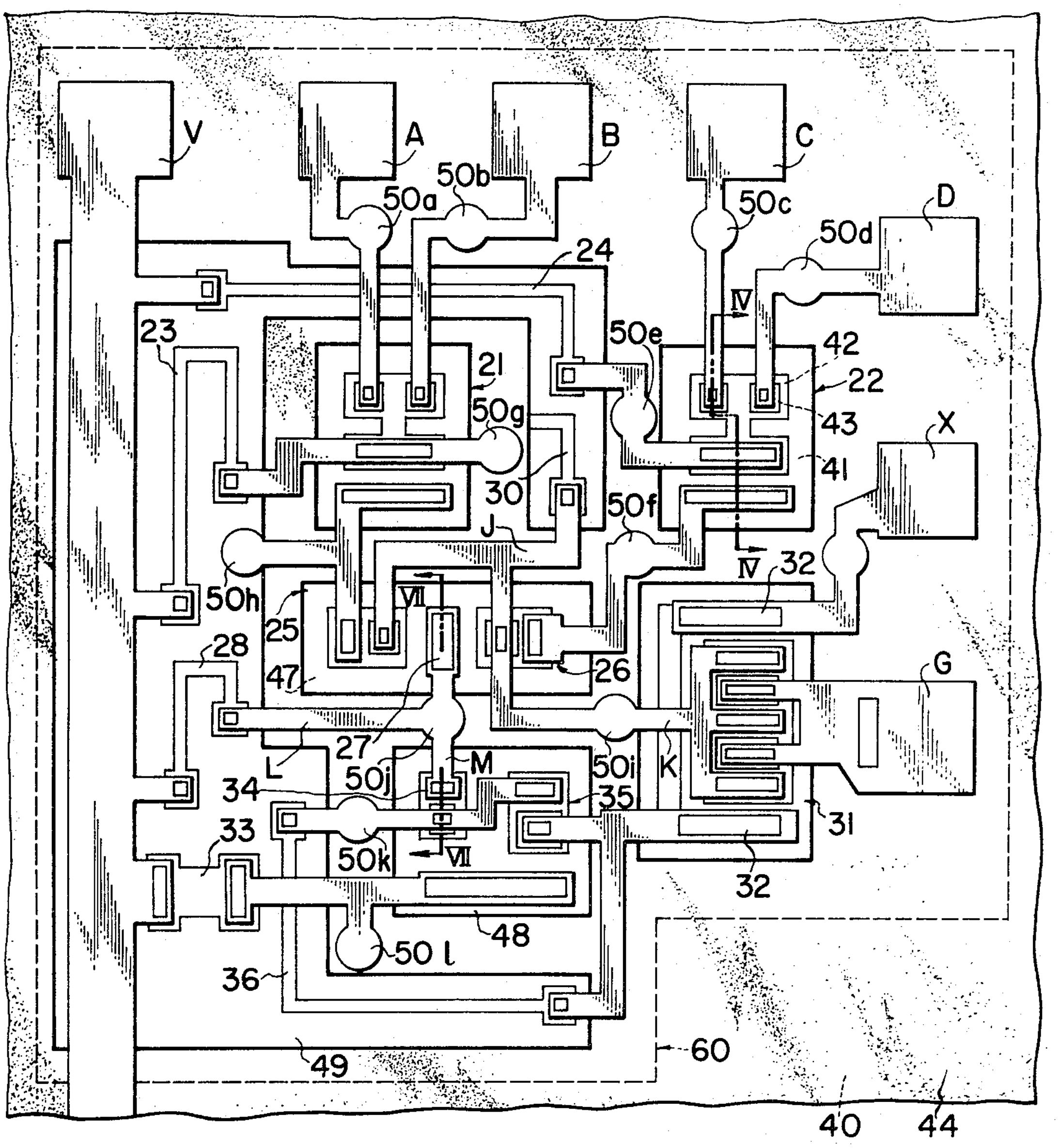
FIG. 3 is a plan view of one unit cell formed on a substrate through integration techniques.

Referring now to FIG. 3, which shows a unit cell actually integrated on a semiconductor substrate wherein one of four unit cells grouped into a block is illustrated in a region 60 surrounded by a broken line. The circuit elements and terminals are designated by the same reference characters as in FIG. 1. The integrated unit cell is formed by any method known in the art and the transistor 22 has the structure shown in FIG. 4, taken along line IV—IV in FIG. 3, for example. The transistor 22 may be formed, for example, in an N-type surface region formed in one surface 40a of a P-type silicon substrate 40. This N-type surface region is formed by forming an N-type epitaxial layer on the surface of the P-type substrate 40 and then isolating a portion of the epitaxial layer by diffusing a P-type impurity from the surface of the epitaxial layer to the P-type substrate 40.

Figure 4:
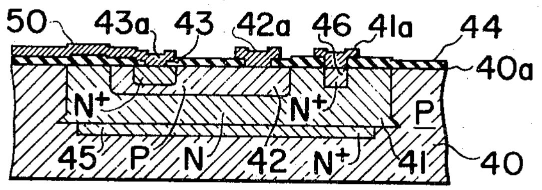
FIG. 4 shows a sectional view of a circuit element of the device of FIG. 3 taken along the line IV—IV.

The transistor 22 comprises an N-isolated surface region 41 as a collector region, a P-type region 42 as a base region formed by diffusing an impurity into the collector region and an N-type region 43 as an emitter region, diffused into the base region. The impurities are diffused into the surface of the substrate through holes formed in an insulating layer 44. The holes may be formed by a photo-etching technique and the impurities are selectively diffused only into the part of the substrate exposed by these holes. The insulating film may be composed of any material conventionally used to form insulating films in semiconductor devices, such as, silicon dioxide and silicon nitride. In this embodiment, a silicon dioxide layer is used. A highly doped buried layer 45 is formed by doping an N+type impurity into the surface of the substrate before the epitaxial layer is formed thereon in order to reduce the equivalent resistance of the collector region 41 of the transistor 22. Another highly doped N+type region 46 is formed in order to reduce the resistance of the collector electrode 41a by diffusing an impurity on the surface of the collector region 41 of the transistor 22 when the emitter region is formed. The formation of the highly doped N+type regions 45 and 46 is effective for semiconductor devices using an epitaxial layer having relatively high sheet resistance. Electrodes 4*a*, 42*a*, and 43*a*, are provided in contact with the collector, base, and emitter regions, respectively of the transistor 22. The numeral 50 designates an interconnection conductor and in FIG. 4 is connected to the electrode 43*a*. Conductor 50 is formed by photo-etching a first metal layer, such as, for example a layer of aluminum, nickel, molybdenum or chromium or a combination of these metals, evaporated on the surface on the insulating layer 44 so as to interconnect the electrodes and terminals of the circuit elements.

The respective transistors are generally formed in the respective N-type surface regions similarly to transistor 22. However, in this embodiment, transistors 25 and 26, and 34 and 35 are formed in the common N-type surface regions 47 and 48, so that the collectors of the respective pairs of the transistors are connected through the N-type regions and require no metal conductor for connecting the collectors. Resistor elements 23, 24, 28, 30, 33 and 36 are formed of the P-type impurity diffusion regions diffused simultaneously with the step of diffusing the base of the transistor in the N-type surface region 49.

Input terminals A, B, C and D, output terminal X, positive terminal V and grounded terminal G are disposed in the neighborhood of the unit cell formation region 60 surrounded by the broken line in the drawing to form so-called pads. In the conventional LSI circuits, the mutual interconnection between the unit cells is done through the pads, but the present invention further provides interconnection terminals 50*a* through 501 in the middle part of the interconnection conductor 50 as shown in FIG. 3 in order to permit interconnection freely between any circuit elements.

The unit cells of this embodiment may be altered in a number of ways. For example, diodes may be substituted for the transistors 34 and 35 connected in Darlington configuration.

After the unit cells are prepared on the semiconductor substrate, as described above, the characteristics of these cells are measured to determine whether each of the cells have predetermined electrical characteristics. The characteristics of the unit cells are determined by measuring the output signal at terminal X when predetermined operational voltages and input signals are applied through the probes attached to the respective pads. A device which automatically inspects all of the unit cells formed on the semiconductor substrate is known in the art. In a preferred embodiment a sign can be printed on unqualified unit cells by a printing device connected to the inspection device. This preferred embodiment allows for a simple method of selecting qualified unit cells on the semiconductor substrate. This selection may be recorded by a data processing apparatus connected to the inspection device so as to determine the distribution of the qualified unit cells on the semiconductor substrate.

After the unit cells have been inspected some of the qualified cells are divided into sub-unit cells , containing one or more circuit elements, by removing a part or parts of the interconnection conductors within these unit cells. The sub-unit cells are then combined with the unit cells to easily form the required LSI circuit devices. In determining the manner in which the qualified unit cells are divided into sub-units cells, the design of the mask required for the etching of the interconnection conductors , the photo-etching of the mutual interconnections between the sub-unit cells and the circuit elements , and the yield of the LSI circuit, since the latter effects the production costs of the LSI circuit devices, are important considerations. It is therefore necessary to determine which sub-unit cells of the qualified unit cells distributed on the semiconductor substrate should be selected to form the respective LSI circuits and from which qualified unit cells the interconnection conductors should be removed. The mask pattern required for the partial removal of the interconnections may be designed by a computer using the information obtained from the data processing apparatus relating to the distribution of the qualified unit cells on the semiconductor substrate. The computer design yields one mask for an entire LSI circuit. However, the process is not practical when a plurality of LSI circuits are to be formed from one substrate. A preferred method for practicing the present invention is to form LSI circuits with qualified unit cells disposed or distributed closely to each other on the semiconductor substrate by the use of a plurality of previously prepared fixed pattern masks. By use of this process LSI circuits may be achieved speedily and easily by selecting the qualified unit cell assembled blocks which have the conditions of the LSI circuit required therefore in the distribution diagram of the qualified unit cells on the semiconductor substrate and by applying the proper mask from the fixed pattern masks prepared in the respective blocks. In the preferred process, the fixed pattern mask is formed as a pattern required for one LSI circuit so that the respective masks are applied to the respective unit cell blocks on the semiconductor substrate. After exposure of the photoresist film through the respective masks, developing of the photoresist film and thereafter etching the conductive layers of the unit cells including in the respective blocks are conducted in one treatment, so that a plurality of LSI circuits may be economically formed from one semiconductor substrate.

Figure 5:
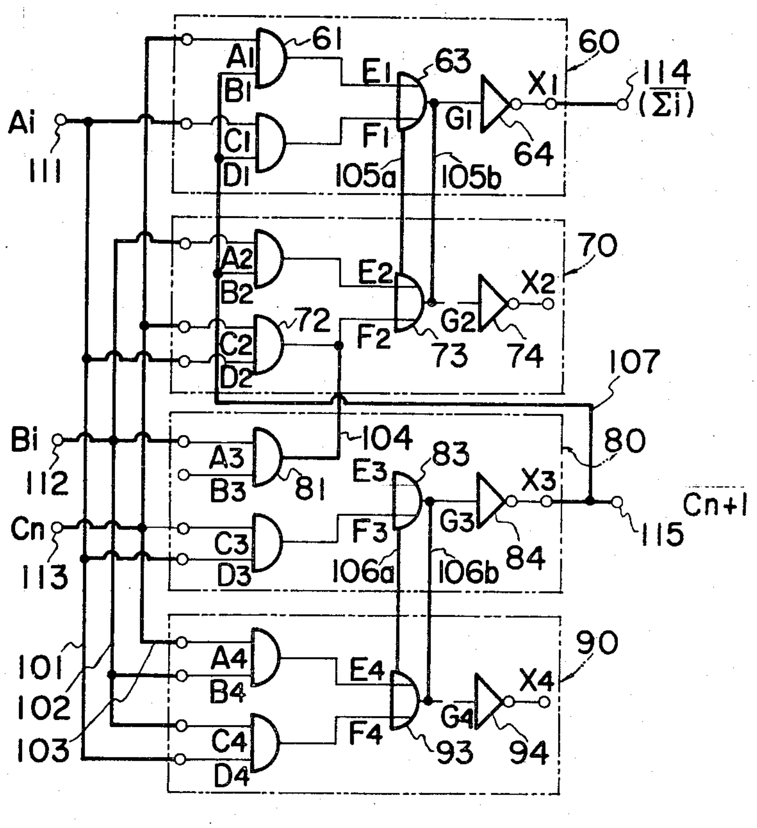
FIG. 5 is a schematic showing of one LSI circuit device constructed with plural unit cells in accordance with the method of the present invention.

In FIG. 5, an interconnection diagram of a one bit binary adder comprising four unit cells 60, 70, 80 and 90, an example of an LSI circuit formed by the method of the present invention is shown. The unit cell 60 of the four unit cells is formed without removing the interconnection conductor while the other three unit cells 70, 80 and 90 are formed in the LSI circuit by being separated into a plurality of sub-unit cells each composed of one or more circuit elements by at least partially removing the interconnection conductors. The INVERTER portions 74 and 94 are separated within the unit cells 70 and 90 while AND gate portion 81 is separated from the other elements in the unit cell 80. In FIG. 5, conductors 101 through 107 designated by thick solid lines are provided after the division of the unit cells has been completed to mutually interconnect between the respective unit cells, and more particularly between the respective unit cells or pads of the sub-unit cells, or connection terminals.

Only one input terminal A3 of the AND gate 81 has an input signal and the output terminal of the AND gate 81 is connected through a conductor 104 to the output terminal of the AND gate 72 contained in the unit cell 70 so that AND gates 81 and 72 form a three-input AND gate. The output of the three-input AND gate is applied to the input terminal F2 of an OR gate 73. The OR gate 73 is connected in parallel with an OR gate 63 contained in the unit cell 60 through conductors 105*a* and 105*b*, whereby the outputs of the OR gate of four inputs E1, F1, E2 and F2 are applied to the input terminal G1 of an inverter 64. Similarly, OR gate 93 contained in the unit cell 90 is connected in parallel with an OR gate 83 contained in the unit cell 80 through conductors 106*a* and 106*b*, thereby forming four-input OR gate with inputs E3, F3, E4, and F4. However, since an input is not applied to the terminal E3 of the four-input OR gate, three outputs of the OR gate applied with three inputs F3, E4 and F4 are actually applied to the input terminal G3 of an inverter 84.

Figure 6:
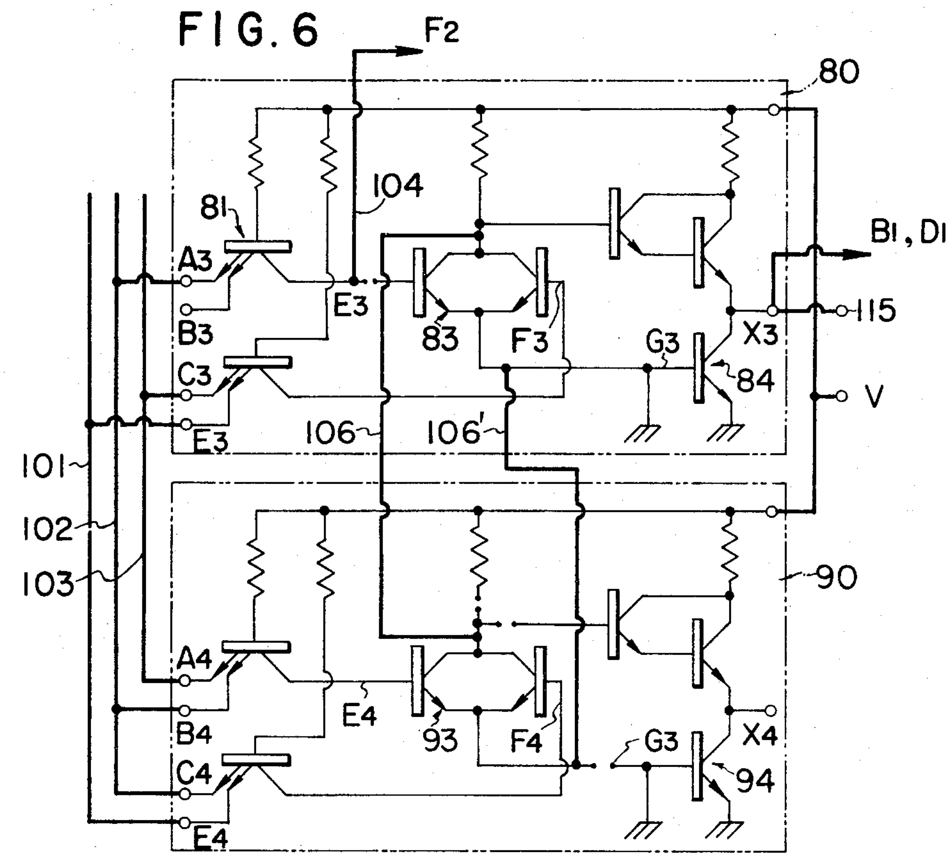
FIG. 6 shows a part of the circuit of FIG. 5.

The aspect of the mutual interconnection between these unit cells will further become clear from FIG. 6, which shows an interconnection diagram of the unit cells 80 and 90 wherein the like circuit elements and conductors are designated by the same reference characters as those in FIG. 5.

The LSI circuit shown in FIG. 5 comprises three input terminals 111, 112 and 113 connected appropriately to the input terminals of the AND gate through conductors 101, 102 and 103, respectively, and two output terminals 114 and 115 connected to the output terminals X1 and X3 of the inverters 64 and 84, respectively. This LSI circuit functions as a binary adder according to the following equation:

$$\overline{Cn+1} = \overline{(Ai+Bi)\cdot Cn + Ai\cdot Bi}$$

By applying signals *Ai* and *Bi* to the input terminals 111 and 112, respectively, and by applying a carrier signal *Cn* to the input terminal 113 to produce an output signal $\overline{\Sigma i}$ from the output terminal 114

$$\overline{\Sigma i} = \overline{(Ai+Bi+Cn)\cdot Cn{+}1 + Ai\cdot Bi\cdot Cn}$$ and a carry signal $\overline{Cn+1}$ from the output terminal 115 to the next state.

After the mutual interconnection between the qualified unit cells is removed in the actual semiconductor LSI circuit, the surface of the semiconductor substrate is covered by an insulating material layer of, for example, silicon dioxide, so that the mutual interconnections are adhered to the insulating material layer. For example, when the OR gate 93 is separated from the inverter 94 in the unit cell 90, the interconnection conductors are actually removed in the portions shown by arrows J, K, L and M in FIG. 3. This technique will now be described with reference to FIGS. 7A through 7D, which show the sectional views taken along the line VII — VII in FIG. 3 including the portion M where the interconnection is removed. The mutual interconnection between the unit cells is performed by the following process.

Figure 7A:
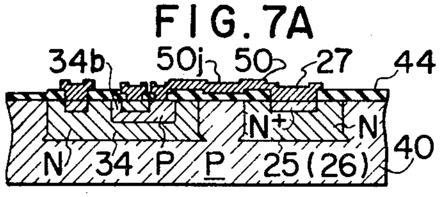
FIGS. 7A through 7D are explanatory sectional views of the respective steps of the method of this invention taken alone the line VII—VII shown in FIG. 3.
Figure 7B:
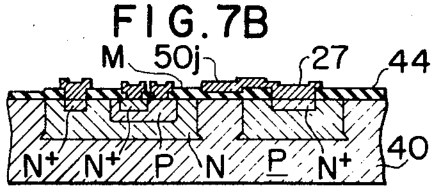
Figure 7C:
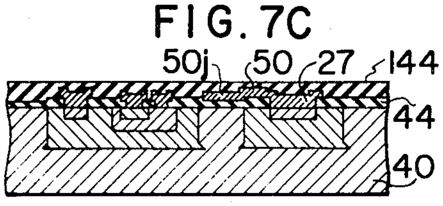
Figure 7D:
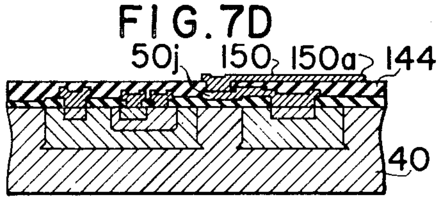

FIG. 7A shows the state before the interconnection conductors are etched, and the conductor 50 connects the base 34*b* of the transistor 34 and the common collector 27 of the transistors 25 and 26 forming the OR gate on the surface of the insulating layer 44. As shown in FIG. 7B, the portion M of the interconnection conductor 50 is removed by photo-etching process. FIG. 7C shows the formation of a second insulating layer 144 on the surface of the semiconductor substrate 40 to cover the conductor layer 50. The insulating layer 144 may be a silicon dioxide layer formed at relatively lower temperatures below 900° C. by the thermal decomposition of an organo oxysilane such as, for example, tetraethoxysilane and ethyltriethoxysilane. Or it may be a layer of silicon nitride. Thereafter, a hole 144*a* is formed by photo-etching, for example, in the second insulating layer 144 exposing the terminal 50*j* as shown in FIG. 7D. A second metal layer, such as, aluminum is formed on the surface of the insulating layer 144. This second metal layer is formed into a mutual interconnection 150 between the unit cells by photo-etching the metal layer. ONe end 150*a* of the second interconnection 150 is connected to the terminal 50*j* of the unit cell 80 (not shown).

It is understood from the foregoing description that the present invention provides a method for fabricating semiconductor LSI circuit devices which employs the step of removing part of the interconnection in the unit cells thereby forming small sized subsections thereof. Accordingly, the unit cells previously formed on the semiconductor substrate of the invention are not always formed to have the most versatile function, but may be of a large scale circuit, since it may later be divided into a number of types of basic functional circuits and thus it may include more circuit elements than the conventional unit cells.

Although the present invention has been described above with reference to unit cells having one layer of mutual interconnection between the unit cells and where the circuit elements in each unit cell are connected through one conduction layer, the present invention is not limited to such structures. The present invention contemplates the preparation of LSI circuits having mutual interconnections formed in a multilayered structure containing an inter-layer of insulating material between the layers of the mutual interconnections. Additionally, the circuit elements and the unit cells may be connected by using more than one conductor layer. Additionally, auxiliary conductors may be provided around the periphery of the respective unit cells. These auxiliary conductors would be useful for a combination with additional interconnection conductors. Further, the present invention is not limited to LSI circuit devices comprising bipolar elements, but is applicable to the LSI circuit devices which comprise field-effect elements.

We claim:

1. A method for fabricating a semiconductor LSI circuit device comprising the steps of:
   a. forming a multiplicity of circuit elements in one surface of a semiconductor substrate;
   b. providing on said surface of the substrate a first insulating layer with apertures therethrough to expose said circuit elements;
   c. forming on said first insulating layer a first conductive layer so as to interconnect through said apertures a relatively large number of the circuit elements into a group, respectively, so that the respective groups form unit cells;
   d. inspecting the characteristics of the respective unit cells to select qualified unit cells;
   e. at least partially removing said first conductive layer so that a desired number of the qualified unit cells are divided into a plurality of sub-unit cells each composed of one or more circuit elements;

f. forming over said first insulating layer and said first conductive layer a second insulating layer with apertures therethrough to expose said sub-unit cells and the remaining non-divided unit cells; and g. forming on said second insulating layer a second conductive layer so as to interconnect through said apertures said subunit cells and said undivided unit cells into an LSI circuit device.

2. A method for fabricating a semiconductor LSI circuit device comprising the steps of:

forming a plurality of active and passive circuit elements spaced from one another on a substrate;

providing a first layer of insulating material on said substrate with apertures therethrough in a pattern that exposes contact areas of the respective circuit elements;

forming interconnection conductors on said first insulating material layer so as to be connected with the exposed contact areas through said apertures and to interconnect some of the circuit elements into groups, each group being isolated from each other and designed to provide a predetermined circuit function, respectively, so that the respective groups form unit cells;

inspecting the characteristics of said respective unit cells so as to select only qualified unit cells having the predetermined circuit function;

removing at least a part of the interconnection conductors of a selected number of the qualified unit cells, respectively, so as to divide each of said selected number of the qualified unit cells into a plurality of sub-unit cells each having at least one of the circuit elements;

providing a second layer of insulating material on said first insulating material layer as well as said interconnection conductors with apertures therethrough in a pattern that exposes some of the interconnection conductors of the qualified unit cells; and interconnecting the exposed interconnection conductors through the apertures of the second insulating material layer so that some of the sub-unit cells and the undivided qualified unit cells form an LSI circuit device.

3. A method of fabricating a semiconductor LSI circuit device comprising the steps of:

forming a plurality of circuit elements spaced apart from one another on a substrate, predetermined ones of said circuit elements including active circuit elements and predetermined others of circuit elements including passive circuit elements;

providing a first layer of insulating material on said substrate having apertures therethrough in a pattern exposing preselected areas of said circuit elements;

forming individual unit cells made up of a plurality of interconnected circuit elements by forming, on said first layer of insulating material, interconnection conductive layers and connecting said conductive layers with exposed contact areas through said apertures to preselected ones of said circuit elements so as to interconnect said circuit elements into groups of circuit elements, each group being isolated from each other and providing a predetermined circuit function for said unit cells;

inspecting the characteristics of said respective unit cells and selecting only qualified operative unit cells having the characteristics of predetermined circuit functions;

dividing a selected number of said qualified unit cells into a plurality of sub-unit cells, each of which includes at least one circuit element among said plurality of circuit elements by removing at least the portion of the interconnection conductors of a selected number of said qualified unit cells, providing a second layer of insulating material on said first layer of insulating material and on said interconnection conductors with apertures therethrough in a specific pattern for exposing some of the interconnection conductors of said qualified unit cells; and interconnecting the exposed interconnection conductors through the apertures of said second layer of insulating material so as to combine selected sub-unit cells and undivided qualified unit cells to form an LSI circuit device.

4. A method according to claim 3, wherein each of said active circuit elements includes at least one PN junction therein.

5. A method according to claim 3, wherein said step of inspecting the characteristics of said unit cells comprises the steps of applying predetermined input signals to selected portions of said interconnection conductors on said first insulating material and detecting output signals taken from other selected portions of said interconnection conductors on said first insulating material.

* * * * *